US008217770B2

(12) United States Patent
Messner et al.

(10) Patent No.: US 8,217,770 B2
(45) Date of Patent: Jul. 10, 2012

(54) SEAT BELT SYSTEM

(75) Inventors: Thomas Wayne Messner, Grand Blanc, MI (US); Brandon Scott Marriott, Waterford, MI (US); Gary Stroik, Swartz Creek, MI (US); Paul Michael Smith, Davison, MI (US); Russ Carlton, Oxford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 667 days.

(21) Appl. No.: 12/314,502

(22) Filed: Dec. 11, 2008

(65) Prior Publication Data

US 2009/0160616 A1 Jun. 25, 2009

Related U.S. Application Data

(60) Provisional application No. 60/996,964, filed on Dec. 12, 2007.

(51) Int. Cl.
*B60Q 1/00* (2006.01)
*G08B 1/08* (2006.01)
*G08B 21/00* (2006.01)

(52) U.S. Cl. ............... 340/425.5; 340/457.1; 340/539.1; 340/687; 340/686.4; 180/268; 180/286; 200/61.58 B; 200/85 A; 701/45

(58) Field of Classification Search ............... 340/425.5, 340/457.1
See application file for complete search history.

(56) References Cited

U.S. PATENT DOCUMENTS

| | | | | |
|---|---|---|---|---|
| 3,874,474 | A | 4/1975 | Quantz | |
| 4,015,236 | A | 3/1977 | Boudeville | |
| 5,520,263 | A | 5/1996 | Suran et al. | |
| 6,024,382 | A | 2/2000 | Baumann | |
| 6,025,783 | A | 2/2000 | Steffens, Jr. | |
| 6,184,785 | B1 * | 2/2001 | Midorikawa | 340/457.1 |
| 6,362,734 | B1 | 3/2002 | McQuade et al. | |
| 6,531,964 | B1 | 3/2003 | Loving | |
| 6,618,022 | B2 | 9/2003 | Harvey | |
| 6,750,764 | B1 | 6/2004 | Henninger | |
| 6,809,640 | B1 | 10/2004 | Sherman | |
| 7,002,457 | B2 | 2/2006 | Stevenson et al. | |
| 7,005,976 | B2 | 2/2006 | Hagenbuch | |
| 7,271,712 | B2 | 9/2007 | Rubel | |
| 7,321,306 | B2 | 1/2008 | Lee et al. | |
| 7,340,809 | B2 | 3/2008 | Tracy et al. | |
| 7,642,907 | B2 * | 1/2010 | Tang et al. | 340/457.1 |
| 2003/0160689 | A1 | 8/2003 | Yazdgerdi | |
| 2004/0066291 | A1 | 4/2004 | Tracy | |
| 2005/0061568 | A1 | 3/2005 | Schondorf et al. | |
| 2006/0103516 | A1 | 5/2006 | Zang | |
| 2006/0139159 | A1 | 6/2006 | Lee et al. | |
| 2006/0176158 | A1 | 8/2006 | Fleming | |
| 2007/0096891 | A1 | 5/2007 | Sheriff et al. | |
| 2007/0139173 | A1 | 6/2007 | Tang et al. | |
| 2007/0139185 | A1 | 6/2007 | Nathan et al. | |
| 2007/0139216 | A1 | 6/2007 | Breed | |
| 2007/0182535 | A1 | 8/2007 | Seguchi | |
| 2007/0205884 | A1 | 9/2007 | Federspiel et al. | |
| 2007/0221428 | A1 | 9/2007 | Strutz et al. | |

* cited by examiner

*Primary Examiner* — Donnie Crosland
(74) *Attorney, Agent, or Firm* — Foley & Lardner LLP

(57) ABSTRACT

A seat belt monitoring system is provided. The seat belt monitoring system includes a seat belt system. The seat belt system has a first portion including a seat belt webbing and a tongue. The seat belt system also includes a buckle. A radio frequency device is associated with the first portion. The seat belt monitoring system further includes a radio frequency receiver that detects either a signal from the radio frequency device or a particular spatial relationship between the radio frequency device and a second radio frequency device placed near the buckle of the seat belt system.

19 Claims, 5 Drawing Sheets
(5 of 5 Drawing Sheet(s) Filed in Color)

SEAT BELT SYSTEM

CROSS REFERENCE TO RELATED APPLICATION

The present application claims the benefit of and priority to U.S. Provisional Patent Application No. 60/996,964, filed Dec. 12, 2007. The foregoing provisional application is incorporated by reference herein in its entirety.

BACKGROUND

The following description of the background of the invention is provided simply as an aid in understanding the invention and is not admitted to describe or constitute prior art to the invention.

The present application relates generally to the field of occupant restraint systems for use in vehicles. More specifically, the disclosed embodiments relate to the use of radio frequency devices to detect seat belt usage and to communicate seat belt usage information to the vehicle's restraint control module. This information may be used to modify air bag deployment, to warn the driver of seat belts not in use, or other purposes.

It has been known to use switches to detect seat belt usage. For example, "slide switches," "micro-switches," or "Hall-effect switches" have been used as such devices within occupant restraint systems to detect seat belt usage. However, wired seat belt switches require numerous wires to run from each seat belt to a single restraint control module. Such switches can be difficult or impossible to implement in vehicle systems.

Accordingly, what is needed is an occupant detection system that wirelessly detects whether a seat belt is properly buckled or engaged. More specifically, what is needed is a wireless seat belt monitoring system that utilizes radio frequency devices to indicate the usage or status of a seat belt.

SUMMARY

According to one embodiment, a seat belt monitoring system is provided that includes a seat belt system. The seat belt system includes a first portion that has a seat belt webbing and a tongue. The seat belt system further includes a buckle. A first radio frequency device is associated with the first portion. A second radio frequency device is placed near the buckle. A radio frequency receiver detects a particular spatial relationship between the first and second radio frequency devices.

According to another embodiment, a seat belt monitoring system is provided that includes a seat belt system. The seat belt system includes a first portion that has a seat belt webbing and a tongue. The seat belt system further includes a buckle. A radio frequency device is associated with the first portion. A radio frequency receiver detects a signal of the radio frequency device. Further, a radio frequency wave altering device actively alters a signal of the radio frequency device.

According to yet another embodiment, a set belt monitoring system is provided that includes a seat belt system. The seat belt system includes a first portion that has a seat belt webbing and a tongue. The seat belt system further includes a buckle. A radio frequency device is associated with the first portion. A radio frequency receiver detects a signal of the radio frequency device and is placed between an occupant and the radio frequency device.

It is to be understood that both the foregoing general description and the following detailed description are exemplary and explanatory only, and are not restrictive of the invention as claimed. These and other features, aspects and advantages of the present invention will become apparent from the following description, appended claims, and the accompanying exemplary embodiments shown in the drawings, which are briefly described below.

BRIEF DESCRIPTION

The patent or application file contains at least one drawing executed in color. Copies of this patent or patent application publication with color drawing(s) will be provided by the Office upon request and payment of necessary fee.

DETAILED DESCRIPTION

Embodiments of the present invention will be described below with reference to the accompanying drawings. It should be understood that the following description is intended to describe exemplary embodiments of the invention, and not to limit the invention.

Figure 1:
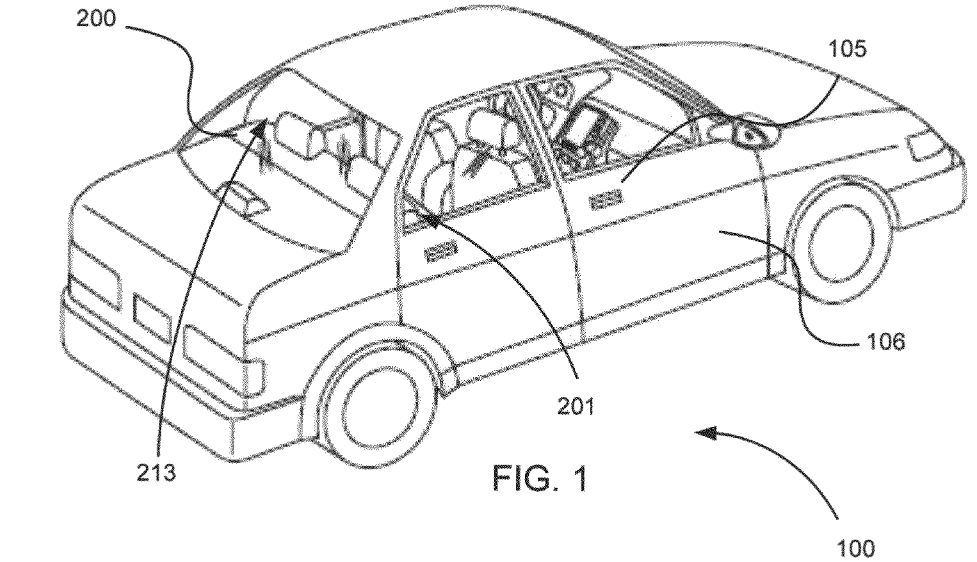
FIG. 1 is a perspective view of a vehicle, according to an exemplary embodiment.

FIG. 1 is a perspective view of a vehicle 100, according to an exemplary embodiment. While a passenger car is represented by vehicle 100, it is intended that any type of vehicle in need of occupant sensing may similarly be used as alternative embodiments. Vehicle 100 includes a restraint control module 105 and a seat system 200. It should be noted that the location of restraint control module 105 is arbitrarily shown as it may be anywhere in vehicle 100. It should also be noted that seat system 200 is intended to apply to any seating row in need of occupant sensing, not just the second row as shown. Seat system 200 includes a first seat belt system 201 equipped with an embodiment of a seat belt monitoring system including a radio frequency receiver (not shown in FIG.), and a second seat belt system 213 equipped with an embodiment of a seat belt monitoring system including a radio frequency receiver (not shown in FIG.). The seat belt monitoring systems of each of the first 201 and second 213 seat belt systems communicate the status of each seat belt system to the restraint control module 105. The communication may be wired or wireless. Additionally, the communication may be interrupt-driven on a change of seat belt system condition or may be accomplished by a periodic polling communication of either a radio frequency receiver or the restraint control module 105. In a wireless embodiment, a significant number of wires that would otherwise be connected to the restraint control module 105 are eliminated.

Additionally, the vehicle 100 is equipped with a vehicle control module 106. The restraint control module 105 may communicate information regarding each of the first 201 and second 213 seat belt systems to the vehicle control module 106. The information received by the vehicle control module 106 may be used to alter airbag deployment, to warn the driver of a vehicle 100 of seat belts not in use, or other purposes. The communication between the vehicle control module 106 and the restraint control module 105 may be interrupt-driven on a change of seat belt system event or may be accomplished by a periodic polling communication of either the vehicle control module 106 or the restraint control module 105. Further, the communication may be wired or wireless.

Any of the vehicle restraint module 105, the vehicle control module 106, or a radio frequency receiver might include a general purpose computing device in the form of a conventional computer, including a processing unit, a system memory, a system bus that couples various system components including the system memory to the processing unit, and software. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer. In another embodiment, any of the vehicle restraint module 105, the vehicle control module 106, or a radio frequency receiver may be implemented with a special purpose computer or embedded device, such as an application-specific integrated circuit (ASIC). In other embodiments, any of the vehicle restraint module 105, the vehicle control module 106, or a radio frequency receiver may be implemented in a plurality of separate computers wherein each of the computers has separate software modules.

Figure 2:
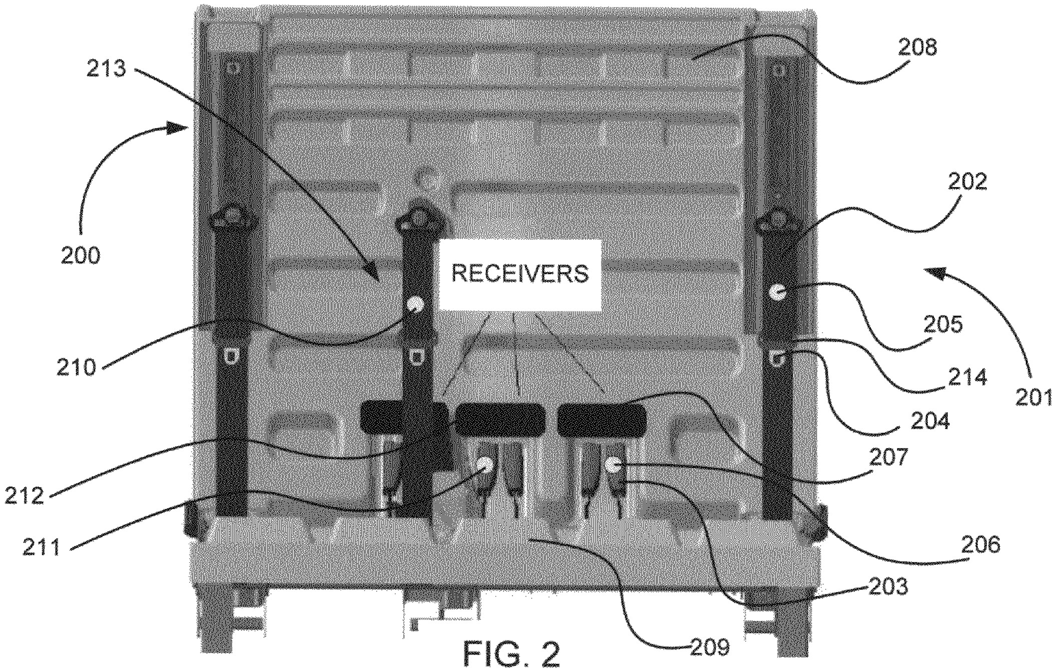
FIG. 2 is a front view of a vehicle seat system including a seat belt monitoring system, according to an exemplary embodiment.

FIG. 2 is a front view of a vehicle seat system 200 including a seat belt monitoring system, according to an exemplary embodiment. The seat belt monitoring system includes a seat belt system 201. The seat belt system 201 includes a seat belt webbing 202, a buckle 203, a tongue 204, and a first radio frequency device 205. A second radio frequency device 206 is placed near the buckle 203. A radio frequency receiver 207 is configured to detect a particular spatial relationship between the first 205 and second 206 radio frequency devices. In some embodiments, the vehicle seat system 200 includes a seat cushion 209 and a seat back 208. While a three passenger bench seat is represented by seat system 200, it is intended that any type of seat system in need of occupant sensing may be used as alternative embodiments.

While FIG. 2 shows a particular embodiment of a radio frequency receiver 207 attached to seat back 208, it should be noted that a radio frequency receiver 207 is not limited to any particular arrangement, as it could also be attached to seat cushion 209 or vehicle 100 or some other useful arrangement. In some embodiments, the radio frequency receiver 207 is placed in close proximity to the first 205 and second 206 radio frequency devices. In other embodiments, the radio frequency receiver 207 is placed anywhere within the vehicle with respect to the first 205 and second 206 radio frequency devices. Further, there may be one radio frequency receiver 207 associated with one set of first 205 and second 206 radio frequency devices of seat belt system 201. In other embodiments, there may be one radio frequency receiver 207 associated with first 205 and second 206 radio frequency devices of seat belt system 201, as well as third 210 and fourth 211 radio frequency devices of a second seat belt system 213. In such an embodiment, the radio frequency devices of seat belt system 201 and the radio frequency devices of second seat belt system 213 reflect or transmit unique signals that allow the radio frequency receiver 207 to distinguish or discriminate between the seat belt statuses of the two seat belt systems. In yet other embodiments, a first radio frequency receiver 207 is associated with the first 205 and second 206 radio frequency devices of a first seat belt system 201, and a second radio frequency receiver 212 is associated with third 210 and fourth 211 radio frequency devices of a second seat belt system 213.

It should be noted that the term "radio frequency device" as used herein and in the claims is intended to encompass all devices that are capable of transmitting or reflecting a radio frequency signal. In some embodiments, the radio frequency device is a passive radio frequency identification device. In other embodiments, the radio frequency device is an active radio frequency identification device. A radio frequency device may be a passive radio frequency device. A radio frequency device may also be an active device. In some embodiments, a radio frequency device transmits or reflects a signal that indicates a particular unique identity. In such embodiments, a radio frequency receiver may distinguish or discriminate the seat belt information of different seat belt systems. In some embodiments, a radio frequency device is a transponder that receives a signal and responds with a signal. In yet other embodiments, a radio frequency device is a transmitter that transmits a signal during a predefined time period, in coordination with a duty cycle, or constantly. In some embodiments, a first radio frequency device and a second radio frequency device may be of different types.

The radio frequency receiver 207 is configured to detect a particular spatial relationship between the first 205 and second 206 radio frequency devices. The particular spatial relationship between the first 205 and second 206 radio frequency devices may indicate that the buckle 203 and the tongue 204 are properly fastened together. Alternatively, the particular spatial relationship between the first 205 and second 206 radio frequency device may indicate other conditions of the seat belt system 201. In one embodiment, the particular spatial relationship indicates that the webbing 202 is placed behind a passenger while the buckle 203 and the tongue 204 are fastened together. In an alternative embodiment, the particular spatial relationship indicates that the buckle 203 and the tongue 204 while being near one another are not properly engaged. In other embodiments, various proximities may indicate other types of misuse such as the buckle 203 being disengaged from the tongue 204 while the vehicle is moving.

The detection may be accomplished in a variety of different ways. In one embodiment, the particular spatial relationship of the first 205 and second 206 radio frequency devices is determined by the strength of each individual signal transmitted or reflected by the first 205 and second 206 radio frequency devices. A calculation from these strengths may be performed to determine their approximate position relative to the radio frequency receiver 207 and to one another. In another embodiment, an alteration of each signal transmitted or reflected by the first 205 and second 206 radio frequency devices because of movement within the vehicle is detected by the radio frequency receiver 207, and calculations may be performed based on these alterations to determine the approximate location of the first 205 and second 206 radio frequency devices relative to the radio frequency receiver 207 and to one another.

In yet other embodiments, the radio frequency receiver 207 interrogates or "pings" each of the first 205 and second 206 radio frequency devices. In such an embodiment, the first radio frequency device 205 responds to the radio frequency receiver 207 with a signal. Similarly, the second radio frequency device 206 responds to the radio frequency receiver 207. In some embodiments, each of the signals from the first radio frequency device 205 and the second radio frequency device 206 interact with one another to create a single detectable signal. In some embodiments, when the first 205 and second 206 radio frequency devices are sufficiently close to one another, a particular "unique" signal or range of "uniquely" identifiable signals is created and detected by the radio frequency receiver 207, thereby indicating that the first 205 and second 206 radio frequency devices are close to one another. In other embodiments, when the first 205 and the second 206 radio frequency devices are sufficiently close to one another, the signal from the first 205 and the second 206 frequency devices cancel each other out. Accordingly, the radio frequency receiver 207 detects the cancellation of the signals previously transmitted or reflected by the first 205 and second 206 radio frequency devices and determines that the first 205 and second 206 radio frequency devices are close to one another.

In yet other embodiments, when the first 205 and second 206 radio frequency devices are sufficiently close to one another, each signal from the first 205 and second 206 radio frequency devices may individually characteristically alter the signal of the other, or in the alternative only one of the two signals characteristically alters the other signal. Accordingly, the radio frequency receiver 207 detects the alteration of either signal or both signals previously transmitted or reflected by the first 205 and second 206 radio frequency devices and determines that the first 205 and second 206 radio frequency devices are close to one another. In further embodiments, when the first 205 and second 206 radio frequency devices are sufficiently close to one another, each signal from the first 205 and second 206 radio frequency devices may mask the signal of the other, or in the alternative only one of the two signals masks the other signal. Accordingly, the radio frequency receiver 207 detects the masking of either signal or both signals previously transmitted or reflected by the first 205 and second 206 radio frequency devices and determines that the first 205 and second 206 radio frequency devices are close to one another. In yet further embodiments, when the first 205 and second 206 radio frequency devices are sufficiently close to one another, each signal from the first 205 and second 206 radio frequency devices may individually interrupt the signal of the other, or in the alternative only one of the two signals interrupts the other signal. Accordingly, the radio frequency receiver 207 detects the interruption of either signal or both signals previously transmitted or reflected by the first 205 and second 206 radio frequency devices and determines that the first 205 and second 206 radio frequency devices are close to one another.

Each of these signal alterations or combinations may be accomplished through various types of radio frequency interference. Further, each of these embodiments may be implemented with a variety of different radio frequency devices as previously discussed.

Some embodiments related to FIG. 2 include a restraint control module 105 (shown in FIG. 1 of vehicle 100). In such embodiments, a radio frequency receiver 207 may communicate the status of a seat belt system 201 to the restraint control module 105. The communication may be wired or wireless. In a wireless embodiment, a significant number of wires that would otherwise be connected to the restraint control module 105 are eliminated. Additionally, the vehicle 100 may be equipped with a vehicle control module 106 that communicates with the restraint control module 105. The communication may be wired or wireless.

Figure 3:
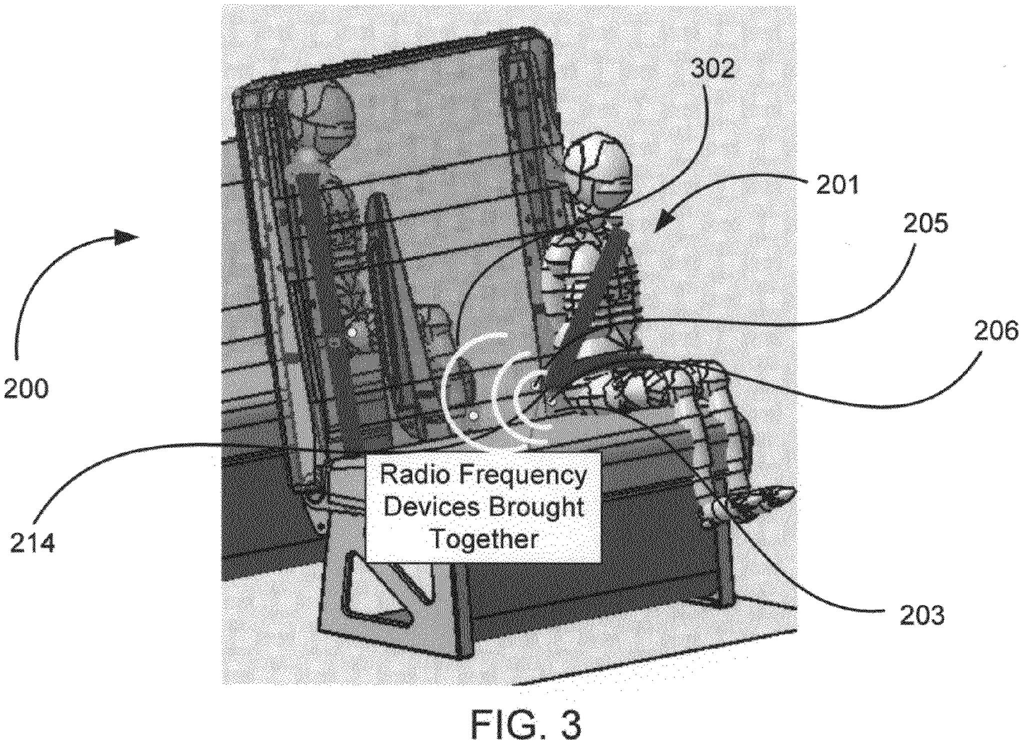
FIG. 3 is a perspective view of a vehicle seat system including a seat belt monitoring system, according to an exemplary embodiment.

FIG. 3 is a perspective view of a vehicle seat system 200 including a seat belt monitoring system, according to an exemplary embodiment. FIG. 3 includes first 205 and second 206 radio frequency devices. The first radio frequency device 205 is attached to the latch plate 214 of the seat belt system. The second radio frequency device 206 is attached to the buckle 203 of the seat belt system 201. As shown, the first 205 and second 206 radio frequency devices have been brought in a position close to one another. Accordingly, a single signal 302 or separate signals 302 (represented by a single set of arcs) are transmitted or reflected from the first 205 and second 206 radio frequency devices. The single signal 302 or separate signals 302 (represented by a single set of arcs) are detected by a radio frequency receiver (not shown in FIG.) to determine the particular spatial relationship of the first 205 and second 206 radio frequency devices.

Figure 4:
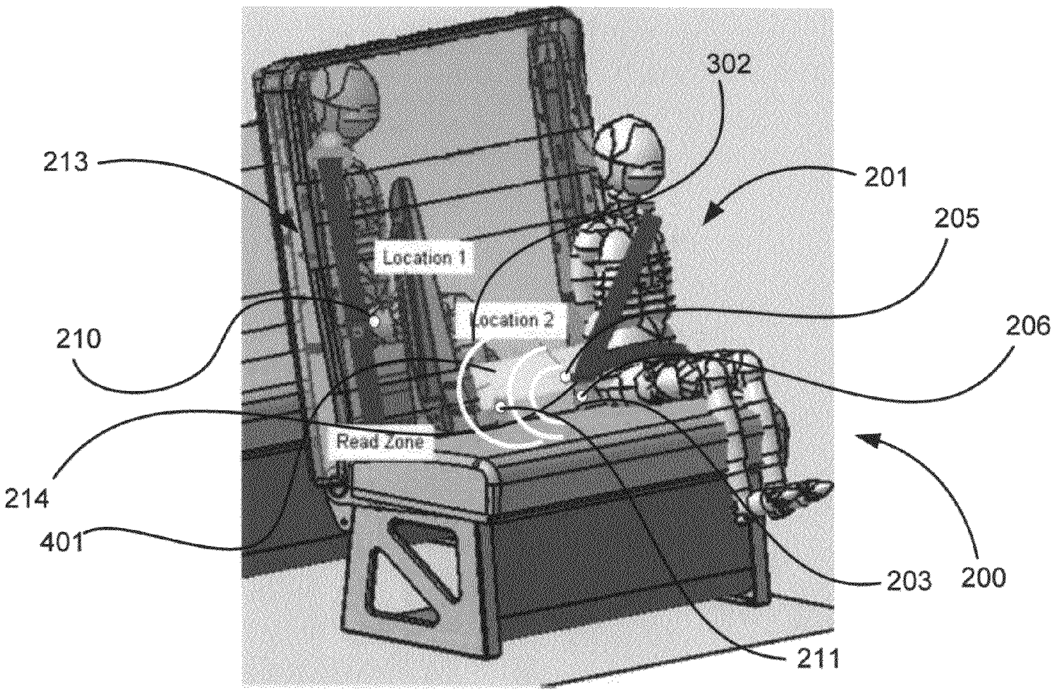
FIG. 4 is a perspective view of a vehicle seat system including a seat belt monitoring system and a zone of focus, according to an exemplary embodiment.

FIG. 4 is a perspective view of a vehicle seat system 200 including a seat belt monitoring system and a zone of focus 401, according to an exemplary embodiment. FIG. 4 includes first 205 and second 206 radio frequency devices. The first radio frequency device 205 is attached to the latch plate 214 of the seat belt system. The second radio frequency device 206 is attached to the buckle 203 of the seat belt system 201. As shown, the first 205 and second 206 radio frequency devices have been brought in a position close to one another. Accordingly, a single signal 302 or separate signals 302 (represented by a single set of arcs) are transmitted or reflected from the first 205 and second 206 radio frequency devices. Here, the signals from the single signal 302 or separate signals 302 (represented by a single set of arcs) may only be detected by the radio frequency receiver (not shown in FIG.) within the zone of focus 401. The zone of focus 401 represents the region in which signals may be detected. The zone of focus 401 may be a cone. In an alternative embodiment a zone of focus 401 may be shaped as a cylinder, rectangle, or other suitable shape.

FIG. 4 also includes third 210 and fourth 211 radio frequency devices of a second seat belt system 213. Here, the unoccupied condition of the second seat belt system 213 is shown where the third 210 and fourth 211 radio frequency devices are not close to one another. In some embodiments, the third 210 and fourth 211 radio frequency devices are associated with the same radio frequency receiver associated with the first 205 and second 206 radio frequency devices of seat belt system 201. In such an embodiment, the radio frequency devices of seat belt system 201 and the radio frequency devices of second seat belt system 213 reflect or transmit unique signals that allow the radio frequency receiver (not shown in FIG.) to distinguish or discriminate between the seat belt statuses of the two seat belt systems. In other embodiments, a first radio frequency receiver (not shown in FIG.) is associated with the first 205 and second 206 radio frequency devices of seat belt system 201, and a second radio frequency receiver (not shown in FIG.) is associated with the third 210 and fourth 211 radio frequency devices of second seat belt system 213.

Figure 5:
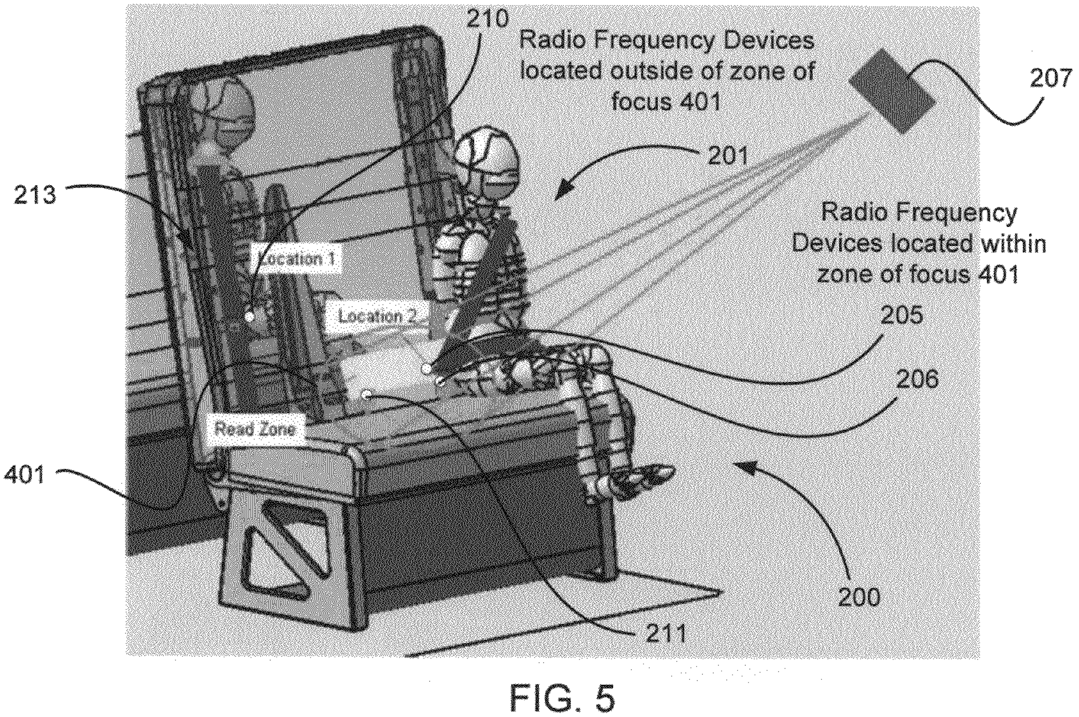
FIG. 5 is a perspective view of a vehicle seat system including a seat belt monitoring system, a zone of focus, and a remote radio frequency receiver, according to an exemplary embodiment.

FIG. 5 is a perspective view of a vehicle seat system 200 including a seat belt monitoring system, a zone of focus 401, and a remote radio frequency receiver 207, according to an exemplary embodiment. FIG. 5 includes first 205 and second 206 radio frequency devices. As shown, the first 205 and second 206 radio frequency devices have been brought in a position close to one another. Accordingly, a single signal 302 or separate signals 302 (represented by a single set of arcs) are transmitted or reflected from the first 205 and second 206 radio frequency devices. Here, the signals from the single signal 302 or separate signals 302 (represented by a single set of arcs) may only be detected by the radio frequency receiver (not shown in FIG.) within the zone of focus 401. The zone of focus 401 represents the region in which signals may be detected. Radio frequency receiver 207 may be located on seat system 200 or anywhere within vehicle 100. Radio frequency receiver 207 may focus in the longitudinal direction or in the cross car direction, vertical direction or any useful direction. Radio frequency receiver 207 may detect one or more radio frequency devices (205, 206, 210, 211) positioned within zone of focus 401. The zone of focus 401 may be a cone. In an alternative embodiment a zone of focus 401 may be shaped as a cylinder, rectangle, or other suitable shape.

Figure 6:
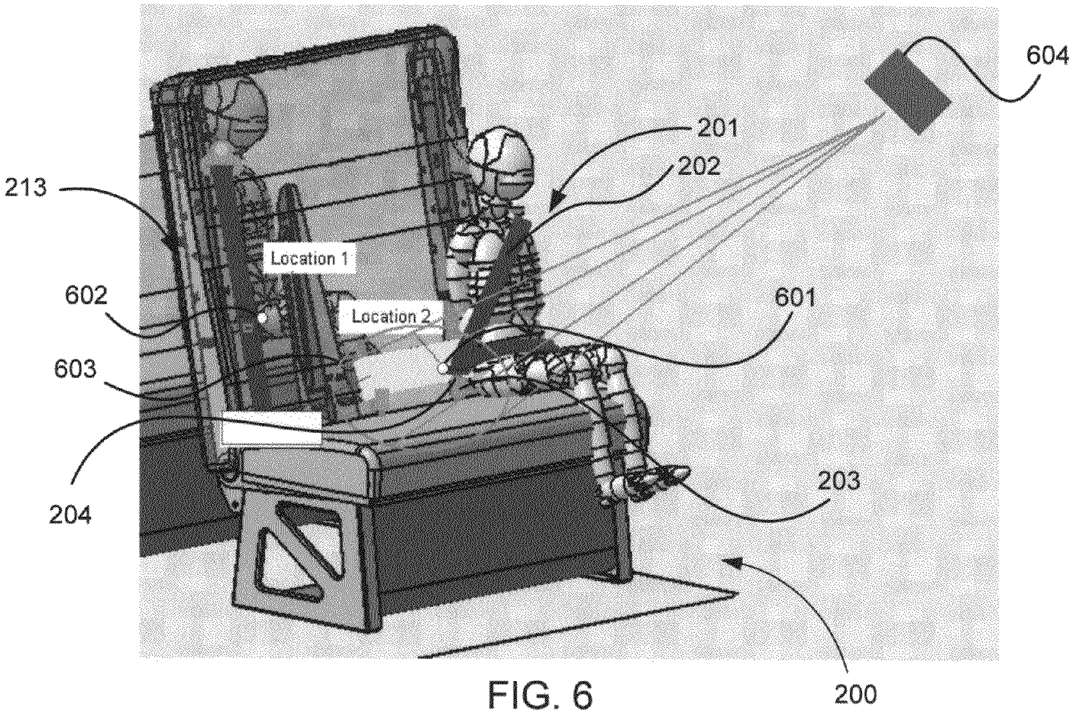
FIG. 6 is a perspective view of a vehicle seat system including a seat belt monitoring system and a zone of active signal alteration, according to an exemplary embodiment.

FIG. 6 is a perspective view of a vehicle seat system 200 including a seat belt monitoring system and a zone of active signal alteration 603, according to an exemplary embodiment. FIG. 6 includes a seat belt system 201. The seat belt system 201 includes a buckle 203, a tongue 204, and a radio frequency device 601. A radio frequency receiver (not shown in FIG.) is configured to detect a signal of the radio frequency device 601. The seat belt system 201 includes a radio frequency altering device 604 configured to actively alter a signal of the radio frequency device 601.

Here, the signal of the radio frequency device 601 is only altered within the zone of active signal alteration 603. The seat belt system tongue 204 is shown as properly engaged with the buckle 203, indicating the system is buckled. Accordingly, in this embodiment when the radio frequency receiver (not shown in FIG.) detects an altered signal of the radio frequency device 601, the system is buckled. When the radio frequency receiver (not shown in FIG.) does not detect an altered signal of the radio frequency device 601, the system is unbuckled as the radio frequency device 601 is not within the zone of active signal alteration 603.

In other embodiments, the zone of signal alteration 603 may be other regions not proximate to the buckle 203 of the seat belt system 201. Accordingly, the system operates in an opposite fashion where detection of an altered signal by the radio frequency receiver (not shown in FIG.) indicates the seat belt system 201 is not buckled properly, and the detection of an unaltered signal by the radio frequency receiver (not shown in FIG.) indicates the seat belt system 201 is buckled properly.

In some embodiments, the radio frequency altering device 604 may be used for a first seat belt system 201 with a first radio frequency device 601, and for a second seat belt system 213 with a second radio frequency device 602. In other embodiments, there are two radio frequency altering devices to be employed separately for each of the first 201 and second 213 seat belt systems. Additionally, the radio frequency altering device 604 may be employed with multiple radio frequency devices for a single seat belt system. Further, the alteration of the signals by the radio frequency altering device 604 may be any variety of alterations as previously discussed with respect to the embodiment of FIG. 2.

The detection of an altered or unaltered signal from the radio frequency device 602 by the radio frequency receiver (not shown in FIG.) may indicate that the buckle 203 and the tongue 204 are properly fastened together. Alternatively, the detection of an altered or unaltered signal may indicate other conditions of the seat belt system 201. The detection of an altered or unaltered signal may indicate that the webbing 202 is placed behind a passenger while the buckle 203 and the tongue 204 are fastened together. The detection of an altered or unaltered signal may indicate that the buckle 203 and the tongue 204 while being near one another are not properly engaged. In other embodiments, various altered and unaltered signals may indicate other types of misuse such as the buckle 203 being disengaged from the tongue 204 while the vehicle is moving.

Some embodiments related to FIG. 6 include a restraint control module 105 (shown in FIG. 1 of vehicle 100). In such embodiments, a radio frequency receiver (not shown in FIG.) may communicate the status of a seat belt system 201 to the restraint control module 105. The communication may be wired or wireless. In a wireless embodiment, a significant number of wires that would otherwise be connected to the restraint control module 105 are eliminated. Additionally, the vehicle 100 may be equipped with a vehicle control module 106 that communicates with the restraint control module 105. The communication may be wired or wireless.

Figure 7:
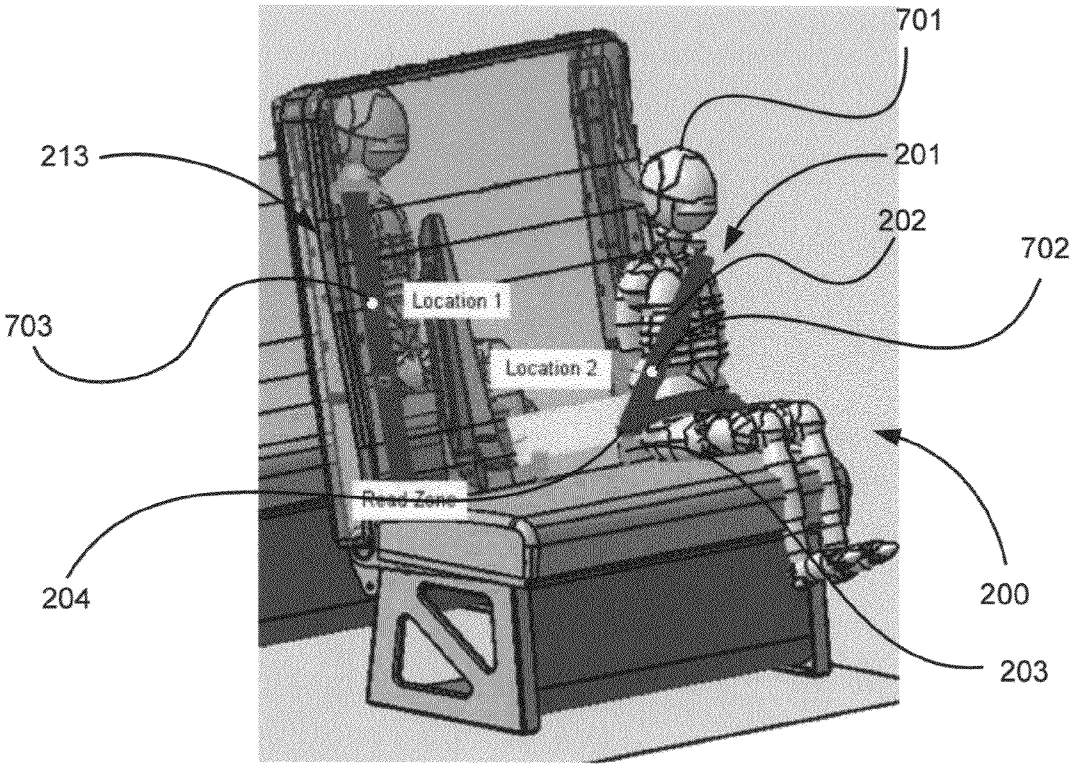
FIG. 7 is a perspective view of a vehicle seat system including a seat belt monitoring system, according to an exemplary embodiment.

FIG. 7 is a perspective view of a vehicle seat system 200 including a seat belt monitoring system, according to an exemplary embodiment. FIG. 7 includes a seat belt system 201. The seat belt system 201 includes a buckle 203, tongue 204, and a radio frequency device 702. A radio frequency receiver (not shown in FIG.) is placed between an occupant 701 and the radio frequency device 702.

In FIG. 7 the tongue 204 and the buckle 203 of the seat belt system 201 are properly engaged. The signal transmitted or reflected by the radio frequency device 702 is altered by the presence of the occupant 701. The alteration of the signal of the radio frequency device 702 may be any variety of alterations as previously discussed with respect to the embodiment of FIG. 2. Accordingly, calculations may be performed based on the signal detected by the radio frequency receiver (not shown in FIG.) to determine whether the seat belt system 201 is buckled properly, as well as specific information related to occupant presence such as position in the seat system 200 or occupant 701 size. For example, when the radio frequency receiver (not shown in FIG.) detects an altered signal an occupant 701 may be seated in the seat position and the buckle may be buckled. In some embodiments, a further radio frequency device is included (not shown) and detection of the signals from the further radio frequency device and the radio frequency device 702 are detected as discussed in the embodiments previously discussed as well as detecting specific information related to occupant presence such as position in the seat system 200 or occupant 701 size. Further, second seat belt system 213 including radio frequency device 703 illustrates an unoccupied state of a seat.

The detection of the signal or alteration of the signal from the radio frequency device 702 by the radio frequency receiver (not shown in FIG.) may indicate that the buckle 203 and the tongue 204 are properly fastened together. Alternatively, the detection of the signal or alteration of the signal may indicate other conditions of the seat belt system 201. The detection of the signal or alteration of the signal may indicate that the webbing 202 is placed behind a passenger while the buckle 203 and the tongue 204 are fastened together. The detection of the signal or alteration of the signal may indicate that the buckle 203 and the tongue 204 while being near one another are not properly engaged. In other embodiments, various detected signals may indicate other types of misuse such as the buckle 203 being disengaged from the tongue 204 while the vehicle is moving.

Some embodiments related to FIG. 7 include a restraint control module 105 (shown in FIG. 1 of vehicle 100). In such embodiments, a radio frequency receiver (not shown in FIG.) may communicate the status of a seat belt system 201 to the restraint control module 105. The communication may be wired or wireless. In a wireless embodiment, a significant number of wires that would otherwise be connected to the restraint control module 105 are eliminated. Additionally, the vehicle 100 may be equipped with a vehicle control module 106 that communicates with the restraint control module 105. The communication may be wired or wireless.

Figure 8:
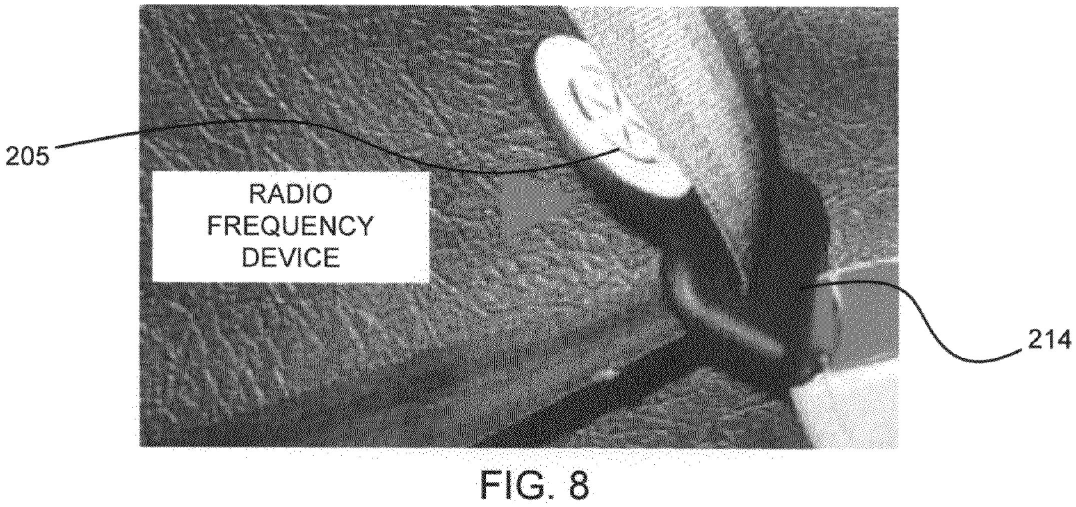
FIG. 8 is a perspective view of a radio frequency device attached directly to the latch plate of a seat belt system, according to one embodiment.

FIG. 8 is a perspective view of a radio frequency device 205 attached directly to the latch plate 214 of a seat belt system, according to one embodiment. It should be noted that the attachment mechanism is not limited to any particular arrangement.

Figure 9:
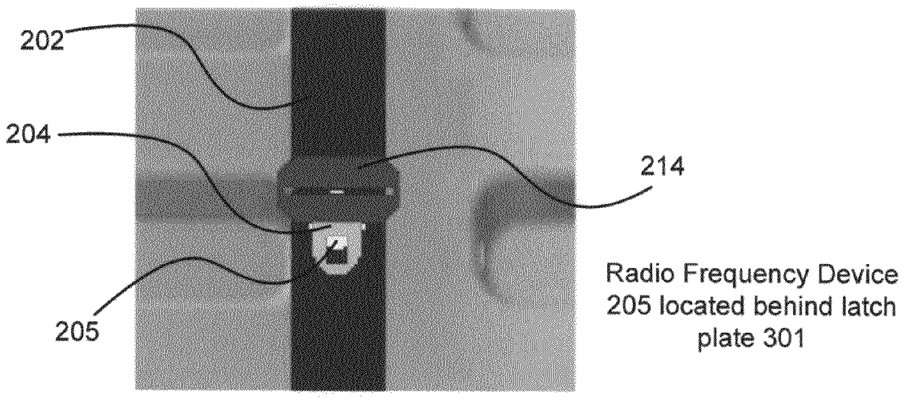
FIG. 9 is a perspective view of a radio frequency device attached directly to a latch plate of a seat belt system, according to one embodiment.

FIG. 9 is a perspective view of a radio frequency device 205 attached directly to a latch plate 214 of a seat belt system, according to one embodiment. The tongue 204 of the seat belt system is also shown. The radio frequency device 205 may be placed near a web-stop button (not shown in FIG.) attached to the webbing 202. It should be noted that the attachment mechanism is not limited to any particular arrangement.

Figure 10:
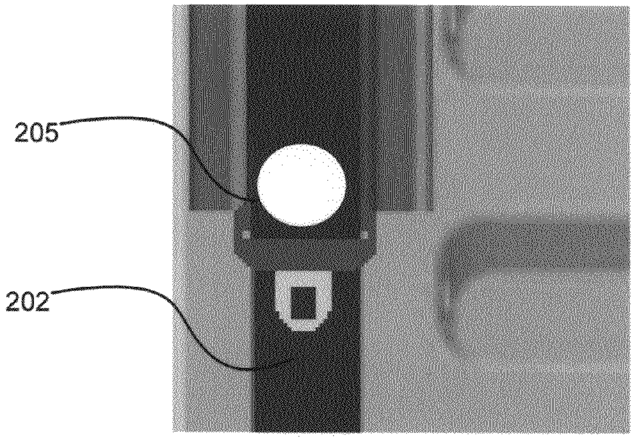
FIG. 10 is a perspective view of a radio frequency device attached to the webbing of a seat belt system, according to one embodiment.

FIG. 10 is a perspective view of a radio frequency device 205 attached to the webbing 202 of a seat belt system, according to one embodiment. It should be noted that the attachment mechanism is not limited to any particular arrangement.

The present system provides a wireless seat belt monitoring system. The system eliminates conventional wires between each seat belt system of a vehicle and the restraint control module of the vehicle. Also, it is known that current restraint control modules have limited capacity to accept inputs, and likely would not be able to accommodate all of the inputs required if all seat belt buckles in a large SUV or van included wired seat belt monitoring systems. Similarly, the present system is advantageous when applied to school busses that incorporate a large number of seat belt systems. The wireless aspect of the present system allows for simple integration of seat belt monitoring systems into a school bus which would otherwise be substantially more difficult with any variation of a wired seat belt monitoring system.

The present system is also applicable to rear seating systems that are removable, or "tumble," or have some relative motion to the vehicle for purposes of utility or convenience. The wireless aspect of the present system allows a user to easily remove and replace, or move a seat without having to disconnect and reconnect any wires. The present system additionally reduces the cost and complexity of seat belt monitoring systems by avoiding unique routing of wires out of the way of possible pinch points, avoiding the addition of more robust insulation, and avoiding the addition of outer protection against the potential wear or damaging of wires due to continued relative motion and continued contact with moving parts. The present system further reduces power consumption required to detect seat belt use.

What is claimed is:

1. A seat belt monitoring system for a vehicle, comprising:

a seat belt system including a first portion, and a buckle, wherein the first portion is comprised of a seat belt webbing and a tongue, and a first radio frequency device is associated with the first portion;

a second radio frequency device placed near the buckle;

a radio frequency receiver configured to detect a particular spatial relationship between the first and second radio frequency devices.

2. The seat belt monitoring system of claim 1, wherein the first radio frequency device is attached to the webbing.

3. The seat belt monitoring system of claim 1, wherein the second radio frequency device is attached to the buckle.

4. The seat belt monitoring system of claim 1, wherein the radio frequency receiver detects a particular spatial relationship between the first and second radio frequency devices by detecting a cancellation of at least one signal from the first and second radio frequency devices.

5. The seat belt monitoring system of claim 1, wherein the radio frequency receiver detects a particular spatial relationship between the first and second radio frequency devices by detecting an alteration of at least one signal from the first and second radio frequency devices.

6. The seat belt monitoring system of claim 1, wherein the radio frequency receiver detects a particular spatial relationship between the first and second radio frequency devices by a combined unique signal.

7. The seat belt monitoring system of claim 1, wherein the radio frequency receiver detects a particular spatial relationship between the first and second radio frequency devices within a zone of focus.

8. The seat belt monitoring system of claim 1, further including a restraint control module configured to process the output of the radio frequency receiver to determine whether the buckle of the seat belt system is buckled.

9. The seat belt monitoring system of claim 8, wherein the radio frequency receiver is configured to wirelessly communicate with the restraint control module.

10. A seat belt monitoring system for a vehicle, comprising:

a seat belt system including a first portion, and a buckle, wherein the first portion is comprised of a seat belt webbing and a tongue, and a radio frequency device is associated with the first portion;

a radio frequency receiver configured to detect a signal of the radio frequency device; and a radio frequency wave altering device configured to actively alter a signal of the radio frequency device only within a zone of active signal alteration.

11. The seat belt monitoring system of claim 10, wherein the radio frequency wave altering device interrupts the signal of the radio frequency device.

12. The seat belt monitoring system of claim 10, wherein the radio frequency wave altering device masks the signal of the radio frequency device.

13. The seat belt monitoring system of claim 10, wherein the radio frequency wave altering device alters a characteristic of the signal of the radio frequency device.

14. The seat belt monitoring system of claim 10, further including a restraint control module configured to process the output of the radio frequency receiver to determine whether the buckle of the seat belt system is buckled.

15. The seat belt monitoring system of claim 14, wherein the radio frequency receiver is configured to wirelessly communicate with the restraint control module.

16. A seat belt monitoring system for a vehicle, comprising:

a seat belt system including a first portion, and a buckle, wherein the first portion is comprised of a seat belt webbing and a tongue, and a radio frequency device is associated with the first portion; and a radio frequency receiver configured to detect a signal of the radio frequency device and placed between an occupant and the radio frequency device.

17. The seat belt monitoring system for a vehicle of claim 16, further comprising:

a second radio frequency device, wherein the radio frequency receiver is configured to detect a signal of the radio frequency device and to detect a particular spatial relationship between the radio frequency device and the second radio frequency device.

18. The seat belt monitoring system of claim 16, further including a restraint control module configured to process the output of the radio frequency receiver to determine whether the buckle of the seat belt system is buckled.

19. The seat belt monitoring system of claim 18, wherein the radio frequency receiver is configured to wirelessly communicate with the restraint control module.

* * * * *